US012718169B2

(12) United States Patent
Ye

(10) Patent No.: US 12,718,169 B2
(45) Date of Patent: Aug. 25, 2026

(54) METHODS, DEVICES, AND HETEROGENEOUS SYSTEMS FOR CONNECTING PRODUCT TO MONITORING SYSTEM

(71) Applicant: Alipay (Hangzhou) Information Technology Co., Ltd., Hangzhou (CN)

(72) Inventor: Rui Ye, Hangzhou (CN)

(73) Assignee: Alipay (Hangzhou) Information Technology Co., Ltd., Hangzhou (CN)

( * ) Notice: Subject to any disclaimer, the term of this patent is extended or adjusted under 35 U.S.C. 154(b) by 301 days.

(21) Appl. No.: 18/390,850

(22) Filed: Dec. 20, 2023

(65) Prior Publication Data

US 2024/0119391 A1 Apr. 11, 2024

Related U.S. Application Data

(63) Continuation of application No. PCT/CN2022/128523, filed on Oct. 31, 2022.

(30) Foreign Application Priority Data

Nov. 10, 2021 (CN) ......................... 202111325514.0

(51) Int. Cl.
*G06F 15/16* (2006.01)
*G06Q 10/0637* (2023.01)

(52) U.S. Cl.
CPC ................................ *G06Q 10/0637* (2013.01)

(58) Field of Classification Search
CPC G06Q 10/0637; G06F 11/302; G06F 11/3006
See application file for complete search history.

(56) References Cited

U.S. PATENT DOCUMENTS

2009/0182865 A1* 7/2009 Karpuram ............... H04L 43/00 709/224
2010/0262866 A1* 10/2010 Nir-Buchbinder ........................... G06F 11/3676 714/38.1

(Continued)

FOREIGN PATENT DOCUMENTS

CN 106342315 11/2012
CN 103279885 9/2013

(Continued)

OTHER PUBLICATIONS

International Search Report and Written Opinion in International Appln. No. PCT/CN2022/128523, mailed on Jan. 6, 2023, 14 pages (with English translation).

(Continued)

*Primary Examiner* — Razu A Miah
(74) *Attorney, Agent, or Firm* — Fish & Richardson P.C.

(57) ABSTRACT

To ensure proper operation of software or hardware products, each product needs to be connected to a monitoring system, so that the monitoring system can monitor the product. Multiple products can be connected to the monitoring system at the same time, so that the monitoring system can monitor the products at the same time. In an example method, meta information is determined based on each functional part comprised in a to-be-connected product. A model of each entity is constructed that is expressed in a form of a dimension table and that corresponds to each entity. Corresponding meta information content is obtained from the to-be-connected product. A monitoring task is configured based on the model of each entity and a functional part to which each entity belongs. The to-be-connected product is monitored based on the monitoring task and meta information content in the model of each entity.

20 Claims, 5 Drawing Sheets

(56) References Cited

U.S. PATENT DOCUMENTS

2012/0131179 A1* 5/2012 Hu ........................ G06F 9/4416 709/224
2013/0117829 A1* 5/2013 Potter ................... H04L 9/3247 709/217
2015/0220416 A1* 8/2015 Johnson .............. G06F 11/3034 710/19
2015/0242778 A1 8/2015 Wilcox et al.
2015/0263909 A1* 9/2015 Okubo .................... H04L 43/10 709/224
2016/0253349 A1* 9/2016 Greetham ............. G06F 16/168 715/748
2017/0214888 A1* 7/2017 Bai ........................ H04N 23/51
2017/0371968 A1* 12/2017 Horowitz .......... G06F 16/90335
2018/0120828 A1* 5/2018 Igawa ................. G06F 11/3055
2020/0348996 A1* 11/2020 Lange ................. G06F 11/0751
2021/0182995 A1* 6/2021 Cella ................... H04L 41/0631
2022/0066896 A1* 3/2022 Zhang ................. G06F 11/3466
2022/0083441 A1* 3/2022 Graham .............. G06F 11/3476
2023/0068467 A1* 3/2023 Sakai .................. G06F 11/3093

FOREIGN PATENT DOCUMENTS

| | | |
|---|---|---|
| CN | 109344059 | 2/2019 |
| CN | 110648081 A | 1/2020 |
| CN | 110728445 A | 1/2020 |
| CN | 111400389 A | 7/2020 |
| CN | 112906206 A | 6/2021 |
| CN | 114020575 | 2/2022 |
| WO | WO 2023/083031 | 5/2023 |

OTHER PUBLICATIONS

International Preliminary Report on Patentability in International Appln. No. PCT/CN2022/128523, mailed on May 23, 2024, 12 pages (with English translation).

* cited by examiner

| IP | Belonging cluster | Belonging equipment room |
|---|---|---|
| | | |
| | | |
| | | |

METHODS, DEVICES, AND HETEROGENEOUS SYSTEMS FOR CONNECTING PRODUCT TO MONITORING SYSTEM

CROSS-REFERENCE TO RELATED APPLICATIONS

This application is a continuation of PCT Application No. PCT/CN2022/128523, filed on Oct. 31, 2022, which claims priority to Chinese Patent Application No. 202111325514.0, filed on Nov. 10, 2021, and each application is hereby incorporated by reference in its entirety.

TECHNICAL FIELD

Embodiments of this specification relate to the field of computer technologies, and specifically, to methods, apparatuses, and heterogeneous systems for connecting a product to a monitoring system.

BACKGROUND

An Internet-based business product provides a corresponding service for a user when operating on the Internet. Each business product can provide a plurality of sub-businesses. For example, Taobao, as a business product, can include a plurality of sub-businesses such as order, billing, and shopping cart. Each sub-business generates corresponding data during operation, and the data can reflect an operating status and a business indicator of the business.

To ensure the operation of business products, each business product needs to be connected to a monitoring system, so that the monitoring system can monitor the business products. A plurality of business products can be connected to the monitoring system at the same time, so that the monitoring system can monitor the plurality of business products at the same time.

At present, a method for connecting the business products to the monitoring system is: The to-be-connected business products take the initiative to undergo a technical transformation, to reveal monitoring information that the monitoring system needs to collect to indicators. Then, the monitoring system can directly collect indicator data from the business products, and analyze and process the collected indicator data.

SUMMARY

In view of the above-mentioned description, embodiments of this specification provide methods, apparatuses, and heterogeneous systems for connecting a product to a monitoring system. According to the technical solutions of the embodiments of this specification, a product can be connected to a monitoring system without intrusion.

According to one aspect of the embodiments of this specification, a method for connecting a product to a monitoring system is provided, including: determining, based on each functional part included in a to-be-connected product, meta information of each entity that serves as a hardware basis of the functional part; constructing, based on the meta information of each entity, a model that is expressed in a form of a dimension table and that corresponds to each entity; obtaining corresponding meta information content from the product based on the meta information in the model corresponding to each entity; configuring a monitoring task based on the model of each entity and a functional part to which each entity belongs; and monitoring the product based on the configured monitoring task and the meta information content in the model corresponding to each entity.

According to another aspect of the embodiments of this specification, an apparatus for connecting a product to a monitoring system is further provided, including: a meta information determining unit, configured to determine, based on each functional part included in a to-be-connected product, meta information of each entity that serves as a hardware basis of the functional part; a model construction unit, configured to construct, based on the meta information of each entity, a model that is expressed in a form of a dimension table and that corresponds to each entity; a meta information content obtaining unit, configured to obtain corresponding meta information content from the product based on the meta information in the model corresponding to each entity; a monitoring task configuration unit, configured to configure a monitoring task based on the model of each entity and a functional part to which each entity belongs; and a monitoring performing unit, configured to monitor the product based on the configured monitoring task and the meta information content in the model corresponding to each entity.

According to another aspect of the embodiments of this specification, a heterogeneous system for connecting a product to a monitoring system is further provided, including: a monitoring system and a hardware device of the product, where the monitoring system is configured to implement the method for connecting a product to a monitoring system as described in any one of the above-mentioned description.

According to another aspect of the embodiments of this specification, an electronic device is further provided, including at least one processor, a storage device coupled to the at least one processor, and a computer program stored in the storage device, where the at least one processor executes the computer program to implement the method for connecting a product to a monitoring system as described in any one of the above-mentioned description.

According to another aspect of the embodiments of this specification, a computer-readable storage medium is further provided, storing a computer program, where when the computer program is executed by a processor, the method for connecting a product to a monitoring system as described above is implemented.

According to another aspect of the embodiments of this specification, a computer program product is further provided, including a computer program, where when the computer program is executed by a processor, the method for connecting a product to a monitoring system as described in any one of the above-mentioned description is implemented.

BRIEF DESCRIPTION OF DRAWINGS

Further understanding of the essence and advantages of the embodiment content of this specification can be realized by referring to the following accompanying drawings. In the accompanying drawings, similar components or features can have the same reference numerals.

DESCRIPTION OF EMBODIMENTS

Figure 1:
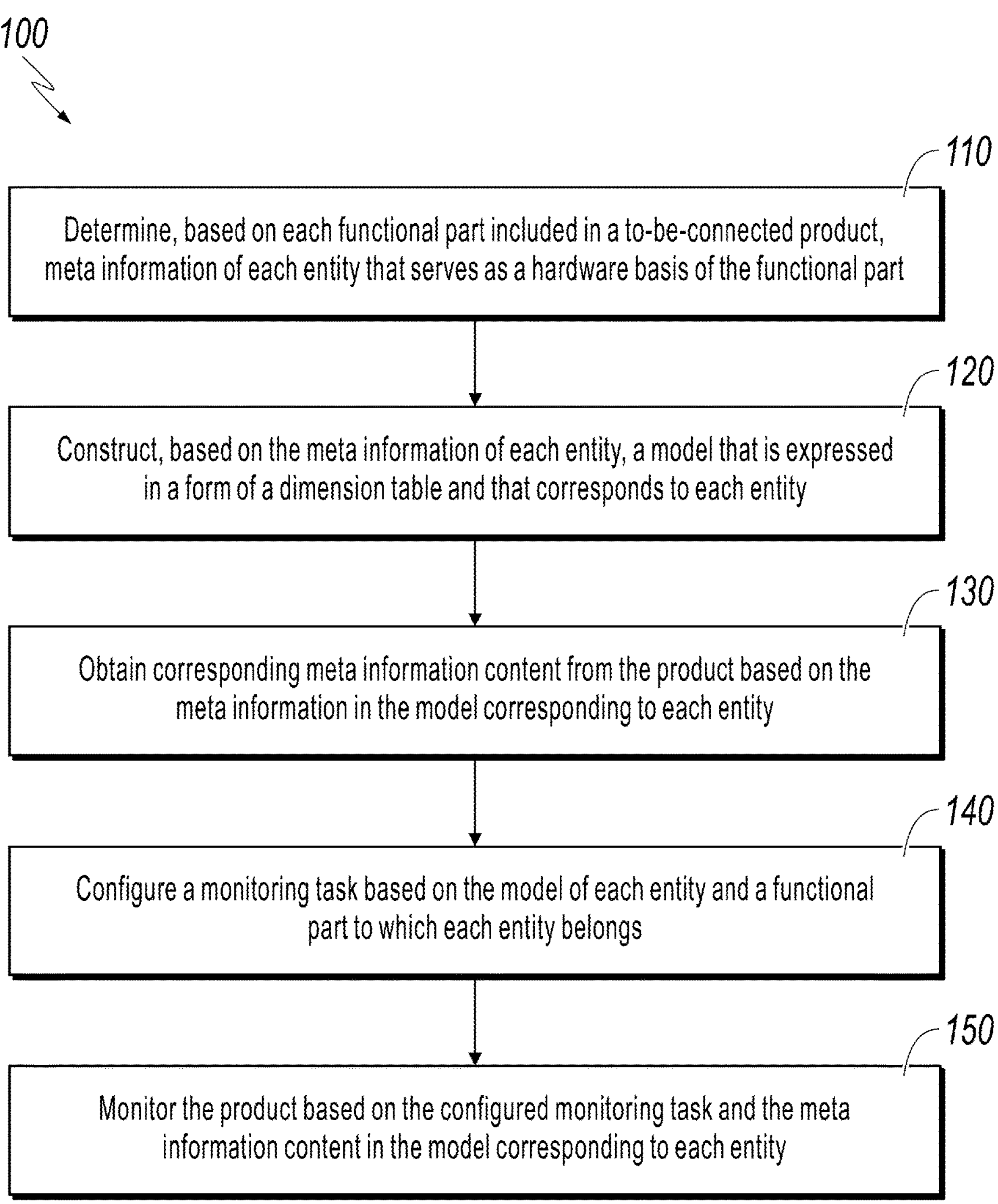
FIG. 1 is a flowchart illustrating an example of a method for connecting a product to a monitoring system, according to some embodiments of this specification.

The subject matter described here will be discussed below with reference to example implementations. It should be understood that these implementations are merely discussed to enable a person skilled in the art to better understand and implement the subject matter described in this specification, and are not intended to limit the protection scope, applicability, or examples described in the claims. The functions and arrangements of the elements under discussion can be changed without departing from the protection scope of the embodiment content of this specification. Various processes or components can be omitted, replaced, or added in the examples as needed. In addition, features described for some examples can also be combined in other examples.

As used in this specification, the term "include" and its variant represent open terms, meaning "including but not limited to". The term "based on" means "at least partially based on". The terms "one embodiment" and "an embodiment" represent "at least one embodiment". The term "another embodiment" means "at least one other embodiment". The terms "first", "second", and the like can refer to different objects or the same object. Other definitions, whether explicit or implicit, can be included below. Unless expressly stated in the context, the definition of one term is consistent throughout this specification.

An Internet-based business product provides a corresponding service to a user when operating on the Internet. Each business product can provide a plurality of sub-businesses. For example, Taobao, as a business product, can include a plurality of sub-businesses such as orders, bills, and shopping carts. Each sub-business generates corresponding data during operation, and the data can reflect an operating status and a business indicator of the business.

To ensure the operation of business products, each business product needs to be connected to a monitoring system, so that the monitoring system can monitor the business products. A plurality of business products can be connected to the monitoring system at the same time, so that the monitoring system can monitor the plurality of business products at the same time.

At present, a method for connecting the business products to the monitoring system is: The to-be-connected business products take the initiative to undergo a technical transformation, to reveal monitoring information that the monitoring system needs to collect to indicators. Then, the monitoring system can directly collect indicator data from the business products, and analyze and process the collected indicator data.

However, in the above connecting method, the connected product needs to undergo a lot of technical transformations to adapt to the monitoring system to which the product is to be connected. The technical transformations of the product are time-consuming and labor-intensive, resulting in reduction in efficiency of connecting the product to the monitoring system. In addition, technical modification to the product needs intrusion to the product, and consequently, the product connected to the monitoring system is intrusive.

In view of the above-mentioned description, the embodiments of this specification disclose methods, apparatuses, and heterogeneous systems for connecting a product to a monitoring system. In the method, meta information of each entity that serves as a hardware basis of each functional part included in a to-be-connected product is determined based on the functional part; a model that is expressed in a form of a dimension table and that corresponds to each entity is constructed based on the meta information of each entity; corresponding meta information content is obtained from the product based on the meta information in the model corresponding to each entity; a monitoring task is configured based on the model of each entity and a functional part to which each entity belongs; and the product is monitored based on the configured monitoring task and the meta information content in the model corresponding to each entity. According to the technical solution, there is no need to carry out a technical transformation of the product, and the product can be connected to the monitoring system without intrusion. In addition, the connecting method provided in the embodiments of this specification is a standardized and process-based connecting method. This standardized and process-based connecting method further improves efficiency of connecting the product to the monitoring system.

The following describes methods, apparatuses, and heterogeneous systems for connecting a product to a monitoring system in the embodiments of this specification with reference to the accompanying drawings.

FIG. 1 is a flowchart illustrating an example of a method 100 for connecting a product to a monitoring system, according to some embodiments of this specification.

Figure 2:
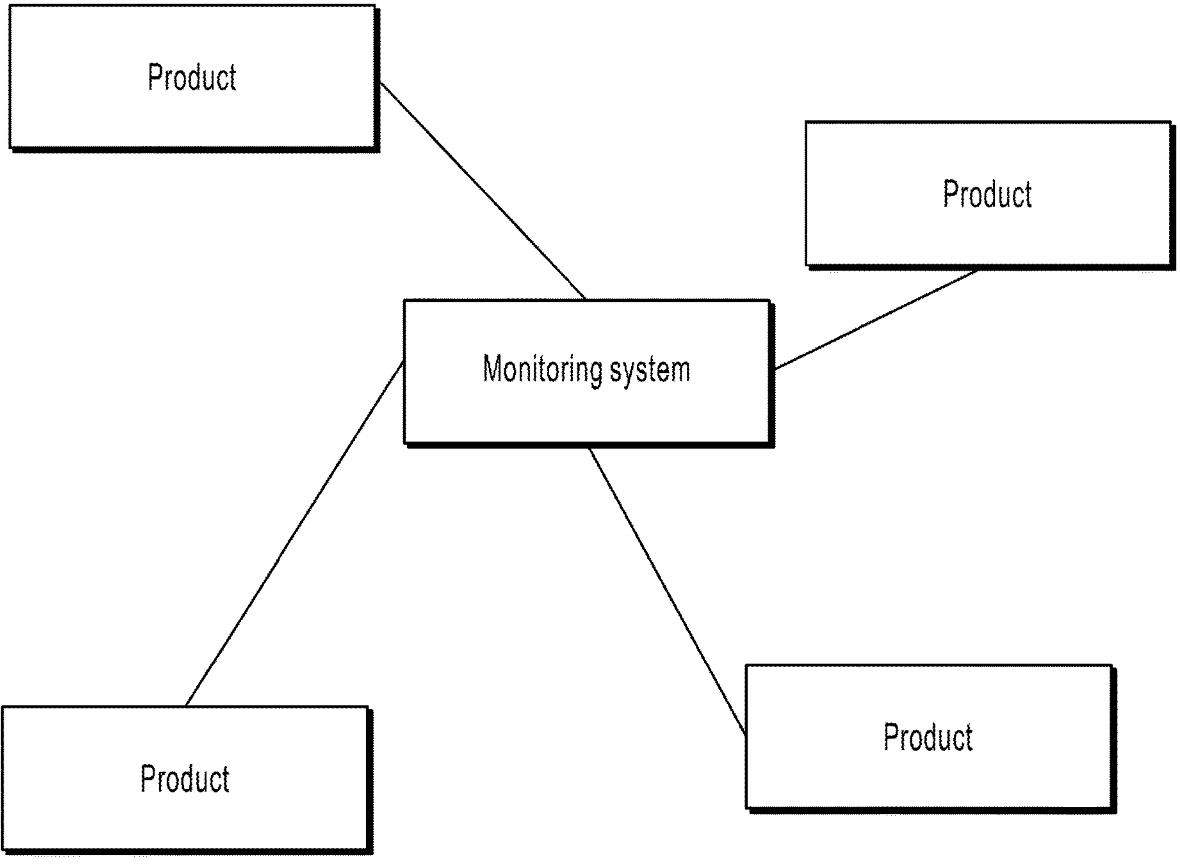
FIG. 2 is a schematic diagram illustrating an example of a relationship between a monitoring system and each monitored product, according to some embodiments of this specification.

The method shown in FIG. 1 can be performed by a monitoring system. A plurality of products can be connected to the monitoring system, and the monitoring system can monitor each connected product. FIG. 2 is a schematic diagram illustrating an example of a relationship between a monitoring system and each monitored product, according to some embodiments of this specification. As shown in FIG. 2, a connection line between a product and the monitoring system indicates that the product is connected to the monitoring system. It should be noted that four products connected to the monitoring system in FIG. 2 are only used as an example. Another quantity of products can also be connected to the monitoring system for monitoring.

As shown in FIG. 1, in 110, determine, based on each functional part included in a to-be-connected product, meta information of each entity that serves as a hardware basis of the functional part.

In the embodiments of this specification, the to-be-connected product can be a product that needs to be monitored. In an example, the to-be-connected product can include a business-type product, an infrastructure-type product, etc. The business-type product can be a product that provides a related business, and the business-type product can include software products such as applications (for example, Taobao) and business services. The infrastructure-type product can be a product including hardware, such as databases and caches.

The product can include a plurality of functional parts, and each functional part can be used as a component of the product. Different functional parts can implement different functions and play different roles in the product. The functions that the functional parts can implement together constitute functions of the product, and the product provides corresponding services based on the functions of the product.

Functional parts included in the business-type product can be functional modules. The functions of the business-type product can be implemented by the included functional modules. Different functional modules can implement different functions. Each functional module can be implemented through software.

For example, the business-type product is Taobao. Taobao can include a plurality of functional modules such as billing, order, and shopping cart. Each functional module can implement a different function. For example, the shopping cart can add an item to the shopping cart, delete an item from the shopping cart, convert an item in the shopping cart to an order, and implement another function related to the shopping cart.

The infrastructure-type product can include hardware devices, and functional parts included in the infrastructure-type product can also include hardware devices. A function implemented by each functional part can be implemented by hardware devices included in the functional part. When the functional part includes a plurality of hardware devices, the plurality of hardware devices can interact with each other to jointly implement the function of the functional part.

In an example, the infrastructure-type product can include several machines, the functional parts included in the infrastructure-type product can be clusters, and each cluster can include a plurality of machines. The plurality of machines in each cluster communicate and connect with each other. The machines in the cluster can be managed and scheduled through a unified system, and the cluster, as a whole, can provide services to the outside.

In the embodiments of this specification, each functional part included in the product can be based on hardware. For example, the cluster included in the infrastructure-type product includes machines, and the functional modules included in the business-type product run on a computer device by using the computer device as a carrier.

Based on this, for each functional part included in the product, each entity (hereinafter referred to as the entity corresponding to the functional part) that serves as a hardware basis of the functional part can be determined. The entity can include hardware devices such as computers. Each functional part can correspond to one or more entities. A quantity of entities corresponding to each functional part can be determined based on a volume of the functional part. The volume of the functional part can include a scale of the functional part and a data processing amount, etc. For example, if a scale of a cluster is large, more entities are included in the cluster. For another example, if a functional module has a large data processing amount and needs a computer with strong computing power to provide support, more computers serve as hardware bases of the functional module.

In the embodiments of this specification, the entity corresponding to each functional part can store data, and the data stored by the entity can include data generated when the functional part implements a related function, for example, data generated when a functional module in the business-type product performs a related operation or business. In addition, the data stored in the entity can also include data stored as a storage device. For example, when the product is a cache, data stored by each entity corresponding to the cache includes data in the cache.

Each entity can have meta information. The meta information of each entity can be determined based on the data in the entity. The meta information of each entity can reflect a type, a structure, and other information of the data stored in the entity. Meta information corresponding to entities storing different data can be different.

In the embodiments of this specification, different products implement different functions, and the functions or businesses implemented by the functional parts included in the product can also be different, so that the data stored in the entities corresponding to the functional parts can be different. Based on this, the meta information of each entity corresponding to each functional part included in the product can be determined based on the functional part.

In an example, when the functional part of the product is a cluster, meta information of each entity included in the cluster can include an IP of the entity, a belonging equipment room, a belonging cluster, etc. In another example, when the functional part of the product is a functional module, and the functional module is configured to perform a related business, the meta information of the entity corresponding to the functional module can include business-related time, a user ID, product information, etc.

Return to FIG. 1. In 120, construct a model corresponding to each entity based on the meta information of each entity.

In the embodiments of this specification, a model is constructed for each entity, and each constructed model can be used to represent the entity corresponding to the model. The constructed model can be in a form of a dimension table. In the dimension table, each column can correspond to a piece of meta information. A table header of each column is meta information, and table elements of each column except the table header are meta information content belonging to the meta information.

In an example, the model corresponding to each entity includes an association relationship between the entity and another entity in the product, and association relationships between entities can be presented by meta information. In an example, an association relationship between a plurality of entities is that the plurality of entities belong to a same object, and then the object to which the plurality of entities belong can be determined as meta information. In this way, meta information can be set to "belonging object" in the model corresponding to each entity. When meta information content in the meta information "belonging object" in the plurality of models is the same, it means that the entities corresponding to the plurality of models belong to a same object. The association relationship between the entities corresponding to the plurality of models includes that the plurality of entities belong to the same object.

For example, the meta information in the model includes a belonging equipment room and a belonging cluster. When meta information content of the belonging equipment room in the meta information of the plurality of models is the same, the entities corresponding to the plurality of models belong to a same equipment room. When meta information content of the belonging cluster in the meta information of the plurality of models is the same, the entities corresponding to the plurality of models belong to a same cluster.

In a model construction process, each piece of meta information of the entity can be determined to correspond to a column in the dimension table. That is, the meta information one-to-one corresponds to columns in the dimension table. The plurality of columns determined by the meta information can form a dimension table, which is the constructed model.

Figures 3, 4:
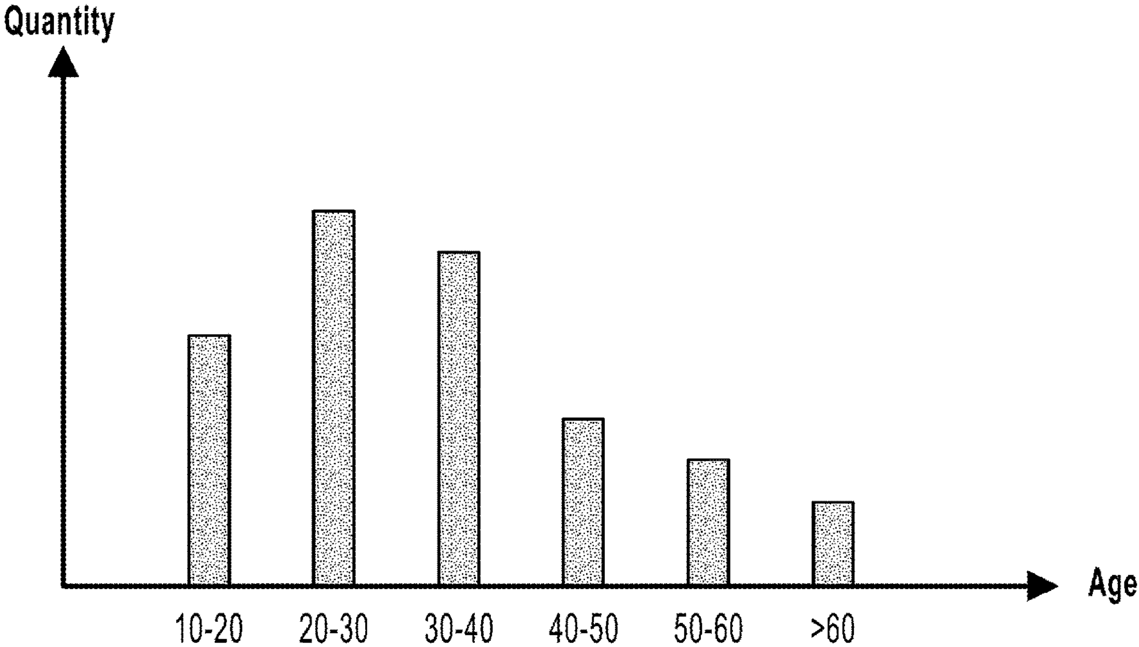
FIG. 3 is a schematic diagram illustrating an example of a model, according to some embodiments of this specification.
FIG. 4 is a schematic diagram illustrating an example of a data chart, according to some embodiments of this specification.

FIG. 3 is used as an example. FIG. 3 is a schematic diagram illustrating an example of a model, according to some embodiments of this specification. As shown in FIG. 3, the meta information of the entity includes IP, a belonging cluster, and a belonging equipment room. Then, the created dimension table includes at least three columns: one column corresponding to the IP, one column corresponding to the belonging cluster, and one column corresponding to the belonging equipment room. The dimension table shown in FIG. 3 is a constructed model of the entity.

In 130, obtain corresponding meta information content from the product based on the meta information in the model corresponding to each entity.

In the embodiments of this specification, the meta information content belonging to the meta information can be obtained based on the meta information in the model. For example, if the meta information is IP, data of an IP address can be obtained from the product, for example, 1.1.1.1. These obtained IP addresses all belong to the content corresponding to the meta information IP. In this way, the meta information content is obtained in a targeted manner. Each obtained meta information content belongs to one of the meta information in the model, to avoid obtaining invalid information and improve product connecting efficiency.

For each entity, after obtaining meta information content of the entity, the monitoring system can add the meta information content to a column to which corresponding meta information in a model corresponding to the entity belongs, to fill a table element in each column in the model with the meta information content. FIG. 3 is used as an example. If the meta information content obtained by the monitoring system includes IP addresses such as 1.1.1.1, 1.1.1.2, and 1.1.1.3, each IP address can be added to a column to which IP in the model shown in FIG. 3 belongs.

In an example, the corresponding meta information content can be obtained from the product based on the meta information in the model corresponding to each entity in an SPI (Service Provider Interface, service provider interface) manner. The SPI can be provided by a service side, and a served side implements an interface so that the service side may not rely on the served side.

In this example, the SPI can be provided by a product that is connected to the monitoring system, and each product can provide one SPI. When the monitoring system needs to obtain the corresponding meta information content from the product, the SPI provided by the product can be invoked to synchronize the meta information content from the product through the invoked SPI.

The meta information content is obtained in the SPI manner, so that the product does not need to be modified, the product does not need to be intruded, and the product is connected to the monitoring system without intrusion.

In addition, the monitoring system can obtain the meta information content from the product in another non-intrusive manner. For example, the product can send meta information content corresponding to each piece of meta information stored locally to the monitoring system based on each piece of meta information determined by the monitoring system, to connect to the monitoring system without intrusion.

After adding the meta information content of the product to the models, the models can reflect data features in the corresponding entities through the meta information and the meta information content. The data feature can reflect an operating status of the product, so that the monitoring system can monitor the connected product based on the meta information and the meta information content in the model.

By dividing the product into a plurality of functional parts, and then sinking each functional part to a corresponding entity, a model is constructed with the entity as an object, so that the monitoring system can obtain data from a lowest-level entity. In addition, by combing a relationship among the product, the functional parts, and the entity, the monitoring system can set a monitoring task for each functional part of the product to monitor separately, to implement hierarchical monitoring of the product.

In 140, configure a monitoring task based on the model of each entity and a functional part to which each entity belongs.

The monitoring task can be configured in units of the functional part of the product. That is, the monitoring task can be configured for each functional part. In an example, a monitoring task can be configured for each functional part based on the functional part to which each entity belongs.

For a functional module, a monitoring task can be configured for each functional part based on a business category included in the functional part to which each entity belongs. The business category included in the functional part can be a monitoring object of a monitoring task, and the business category included in the functional part can include a category of a business that the functional module can execute.

When configuring the monitoring task, each business category included in the functional part can be added to the monitoring task corresponding to the functional part, so as to monitor each business category.

For a functional part (for example, a cluster) including hardware devices, a monitoring task can be configured for each functional part based on entity distribution in the functional part. All entities included in the functional part can be divided into several entity sets based on the entity distribution, and each entity set includes at least one entity. For example, the entity sets can be distinguished based on the distribution of the entities in equipment rooms. That is, the entities belonging to a same equipment room can be treated as one entity set, and a quantity of obtained entity sets is a quantity of equipment rooms.

Each entity set can be a monitoring object of a monitoring task, so that when a monitoring task is configured, each entity set included in the functional part can be added to the corresponding monitoring task of the functional part to monitor each entity set.

In another example, a data indicator can be alternatively configured for each functional part based on the model of each entity and/or the functional part to which each entity belongs.

The data indicators can be used to collate and present the data, and different data indicators can reflect statuses of the data from different angles. For example, for a batch of online purchase data, when the data indicator is gender, the batch of online purchase data can be sorted based on gender to reflect a proportion of males and females in online purchase in a period of time. When the data indicator is an age group, the batch of online purchase data can be sorted based on the age group to reflect a proportion of users in each age group of online purchase in a period of time.

In a configuration manner, the data indicator can be configured for the functional part based on a model corresponding to each entity that serves as the hardware basis of the functional part. In this configuration manner, meta information of some columns in the model can be determined as the data indicator, and the meta information determined as the data indicator can be customized. For example, if the meta information in the model includes the belonging equipment room, the belonging cluster, etc., the belonging equipment room and the belonging cluster can be determined as the data indicator.

In another configuration manner, the data indicator can be configured for each functional part based on the functional part to which each entity belongs. In this configuration manner, each functional part can be used to perform some businesses or implement some functions, and the data indicator can be configured based on the businesses or functions implemented by the functional part. The configured data indicator is associated with a business performed by the functional part or a function implemented by the functional part, and the configured data indicator can reflect a status of a business feature of the business performed by the functional part or an implemented function. For example, the functional part of the product is an order module, and businesses of the order module can include order displaying, deletion, sharing, etc. Then, the configured data indicator can be a user gender associated with the order, and order data of the order module can be sorted based on the user gender, so that a male/female ratio of shopping can be reflected.

In another configuration manner, the data indicators can be configured for the functional parts based on the model of each entity and the functional part to which each entity belongs.

In 150, monitor the product based on the configured monitoring task and the meta information content in the model corresponding to each entity.

A manner of product monitoring can include data displaying, alarm, etc. Displayed data can be processed data that can reflect an operating status of the product. The alarm can be performed based on a result of data displaying, and when the alarm operation is performed, it indicates that an abnormality occurs during operation of the product. For the alarm operation, a threshold can be predetermined as an alarm threshold, and then the result of data displaying is compared with the threshold. If the threshold is not exceeded, no alarm is needed. If the threshold value is exceeded, an alarm can be issued.

In an example of data displaying, the meta information content of each functional part is processed based on the configured monitoring task and data indicator of each functional part. A processing manner can include data sorting, data visualization, etc. The manner of data visualization can include chart presentation, etc. Types of charts can include pie charts, column bar charts, bar charts, line charts, etc.

In this example, the entity that serves the hardware basis of the functional part corresponding to the monitoring task and the model corresponding to each entity can be determined in units of each monitoring task. The meta information content is obtained from each of the determined models, and the obtained meta information content is data related to the functional part corresponding to the monitoring task. Meta information content needed by the data indicator is selected. Then, selected meta information content can be sorted based on a data indicator, and the sorted data can be displayed in a chart, to implement visualization of the data.

For example, in a monitoring task in which the functional part is an order module, the meta information of the order module includes an age, and the data indicator is age groups: 10 to 20, 20 to 30, 30 to 40, 40 to 50, 50 to 60, and greater than 60. The meta information content in the order module can be sorted based on the age groups, and the obtained data chart is shown in FIG. 4.

In an example of the embodiments of this specification, after the product is connected to the monitoring system, when there is an update on the connected product, an updated functional part in the product can be determined. The updated functional part can be a new functional part in the product, or can be a functional part updated on the basis of the original functional part in the product.

After the updated functional part is determined, an entity corresponding to the updated functional part can be determined, and the determined entity serves as a hardware basis of the updated functional part. The model corresponding to the determined entity can then be constructed or updated based on the updated meta information in the entity.

There is an update on the functional part. Therefore, new data can be generated based on the updated functional part, new meta information can be determined based on these new data, and the determined new meta information represents the new data generated by the updated functional part. When an entity corresponding to the updated functional part is a new entity, a model corresponding to the entity can be constructed based on the updated meta information in the entity. When the entity corresponding to the updated functional part is an existing entity, an original model corresponding to the entity can be updated based on the updated meta information in the entity. For example, when the updated meta information includes the new meta information, a column can be added to the dimension table on the basis of the original model corresponding to the entity, and the added column is a column of the new meta information.

After the model is reconstructed or updated, the corresponding meta information content can be obtained from the product based on the updated meta information in the constructed or updated model, to monitor the product based on the newly obtained meta information content and the original meta information content of each functional part.

In the above example, when there is an update on the product, the monitoring system to which the product is connected can update the model of the product accordingly, so that the meta information content for monitoring by the monitoring system is synchronized with the product, to ensure accuracy of monitoring by the monitoring system.

Figure 5:
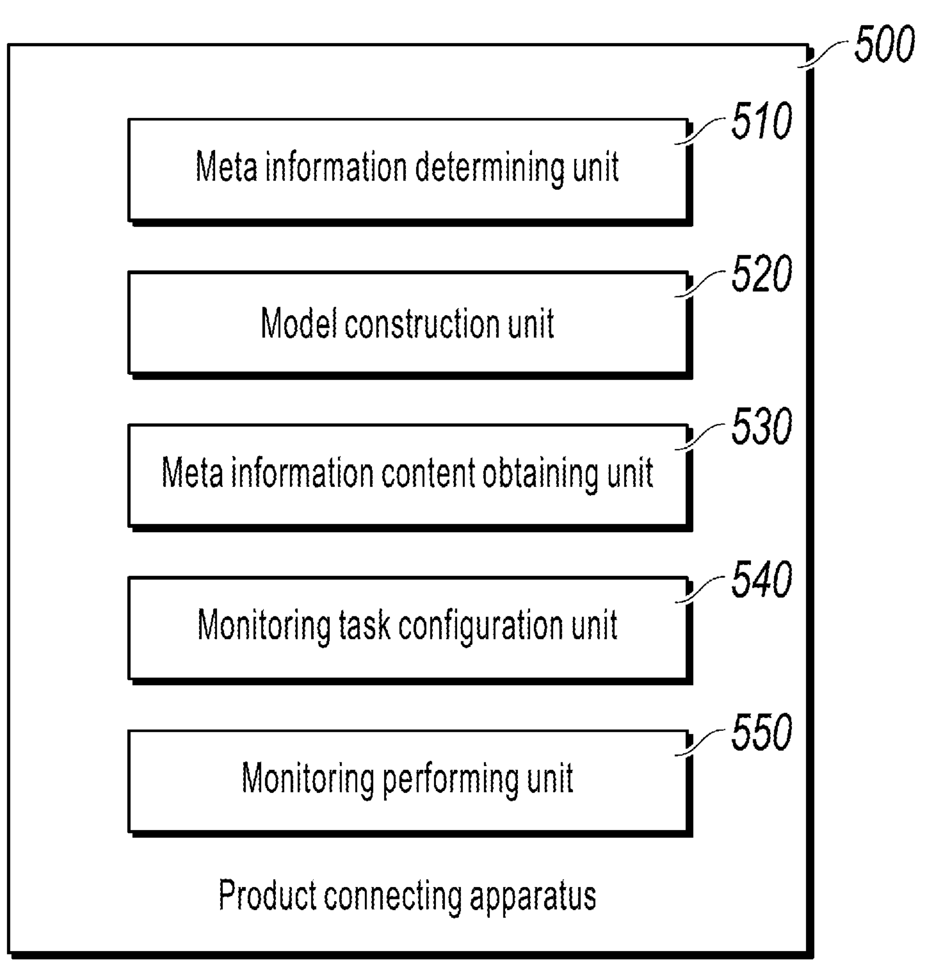
FIG. 5 is a block illustrating an example of an apparatus for connecting a product to a monitoring system, according to some embodiments of this specification.

FIG. 5 is a block diagram illustrating an example of an apparatus for connecting a product to a monitoring system (hereinafter referred to as a product connecting apparatus 500), according to some embodiments of this specification.

The product connecting apparatus 500 shown in FIG. 5 can be used in a monitoring system. As shown in FIG. 5, the product connecting apparatus 500 includes a meta information determining unit 510, a model construction unit 520, a meta information content obtaining unit 530, a monitoring task configuration unit 540, and a monitoring task configuration unit 540.

The meta information determining unit 510 is configured to determine, based on the functional part, meta information of each entity that serves as a hardware basis of each functional part included in a to-be-connected product.

The model construction unit 520 is configured to construct, based on the meta information of each entity, a model that is expressed in a form of a dimension table and that corresponds to each entity.

The meta information content obtaining unit 530 is configured to obtain corresponding meta information content from the product based on the meta information in the model corresponding to each entity. In an example, the meta information content obtaining unit 530 can be further configured to obtain, in an SPI manner, corresponding meta information content from the product based on the meta information in the model corresponding to each entity.

The monitoring task configuration unit 540 is configured to configure a monitoring task based on the model of each entity and a functional part to which each entity belongs.

The monitoring performing unit 550 is configured to monitor the product based on the configured monitoring task and the meta information content in the model corresponding to each entity.

In an example, the monitoring task configuration unit 540 can be further configured to configure a monitoring task for each functional part based on the functional part to which each entity belongs; and configure a data indicator for each functional part based on the model of each entity and/or the functional part to which each entity belongs. The monitoring performing unit 550 can be further configured to process the meta information content of each functional part based on the configured monitoring task and data indicator of each functional part.

In an example, the product connecting apparatus 500 can further include an entity determining unit, and the entity determining unit can be configured to: when there is an update on the product, determine an entity corresponding to an updated functional part. The model construction unit 520 can be further configured to build or update a model corresponding to the determined entity based on the updated meta information in the entity. The meta information content obtaining unit 530 can be further configured to obtain corresponding meta information content from the product based on updated meta information in the constructed or updated model.

Figure 6:
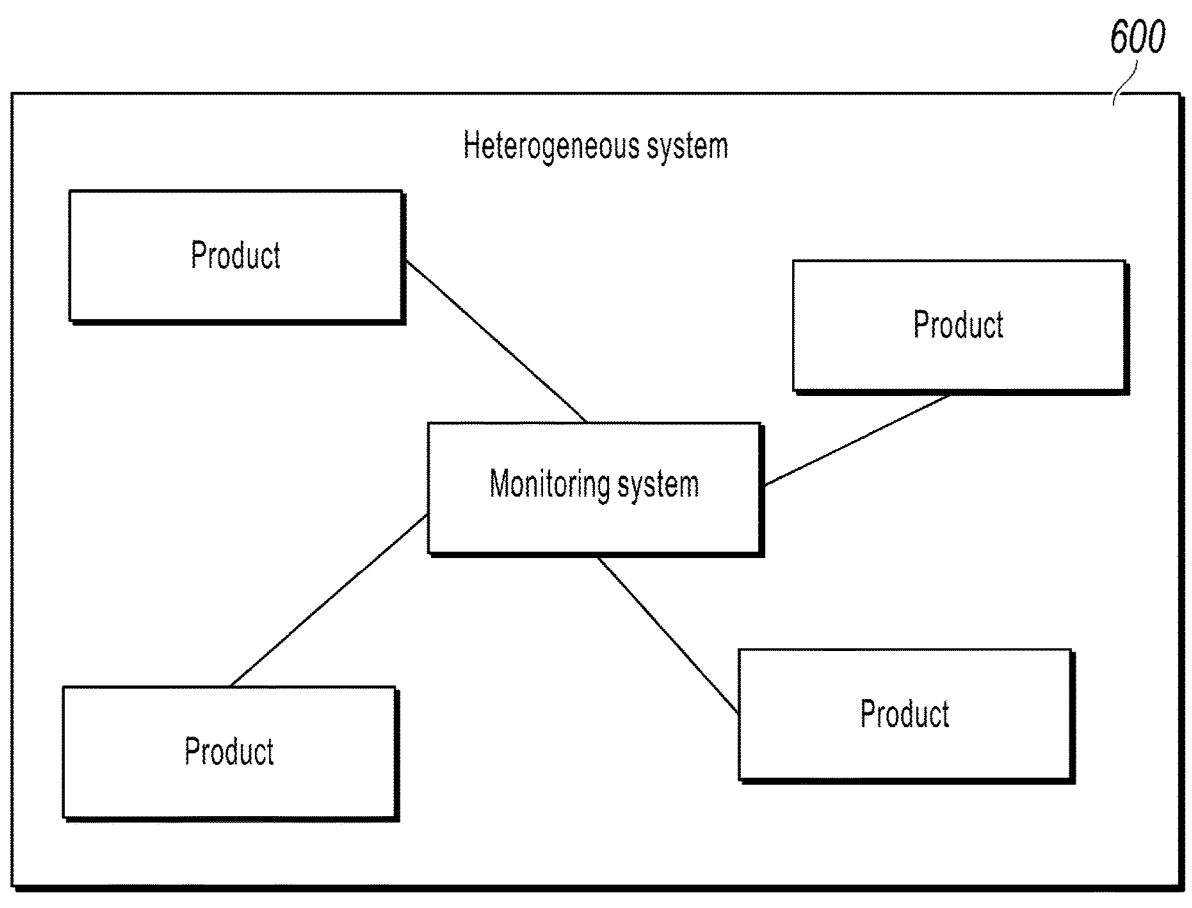
FIG. 6 is a block illustrating an example of a heterogeneous system for connecting a product to a monitoring system, according to some embodiments of this specification.

FIG. 6 is a block diagram illustrating an example of a heterogeneous system for connecting a product to a monitoring system, according to some embodiments of this specification.

As shown in FIG. 6, the heterogeneous system can include a monitoring system and a hardware device of a product. The product can be a product that is connected to the monitoring system or a product that is to be connected to the monitoring system. The monitoring system can be configured to perform the method for connecting a product to a monitoring system provided in the embodiments of this specification.

Embodiments of methods and apparatuses for connecting a product to a monitoring system according to embodiments of this specification are described above with reference to FIG. 1 to FIG. 6.

The apparatus for connecting a product to a monitoring system in the embodiments of this specification can be implemented by using hardware, or can be implemented by using software or a combination of hardware and software. Software implementation is used as an example. As a logical device, the device is formed by reading a corresponding computer program instruction in a storage device to a memory by a processor of a device where the device is located. In the embodiments of this specification, for example, the apparatus for connecting a product to a monitoring system can be implemented by an electronic device.

Figure 7:
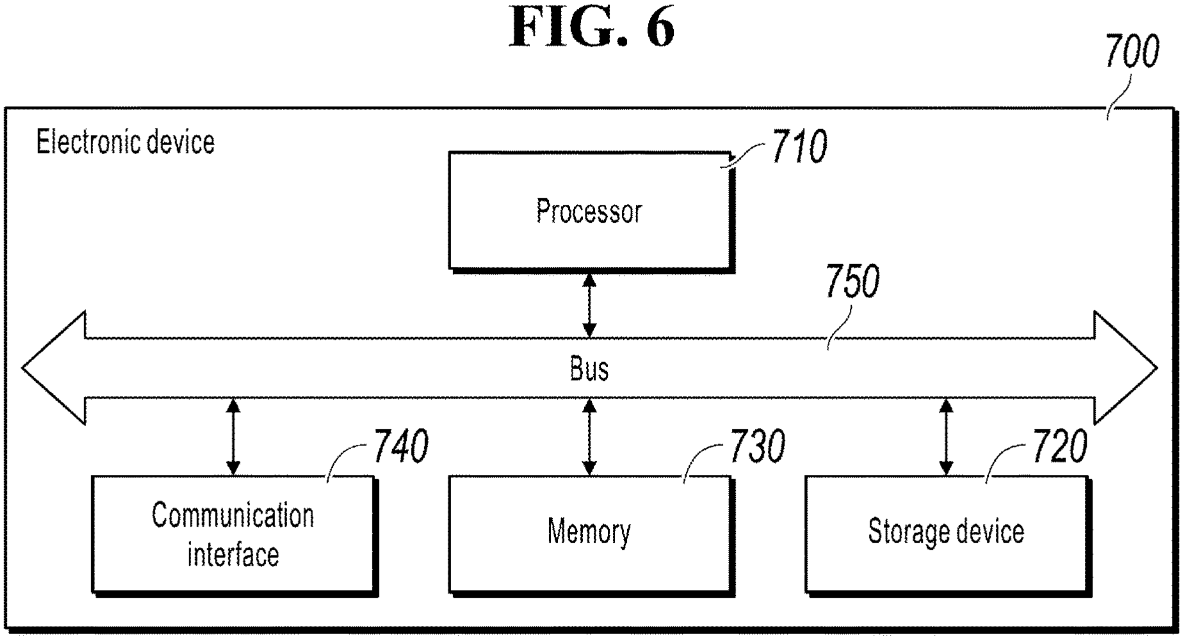
FIG. 7 is a block diagram of an electronic device configured to implement a product connecting method, according to some embodiments of this specification.

FIG. 7 is a block diagram illustrating an electronic device configured to implement a product connecting method, according to some embodiments of this specification.

As shown in FIG. 7, the electronic device 700 can include at least one processor 710, a storage device (for example, a non-volatile storage device) 720, a memory 730, and a communication interface 740, and the at least one processor 710, the storage device 720, the memory 730, and the communication interface 740 are connected together through a bus 750. The at least one processor 710 executes at least one computer-readable instruction (namely, the above-mentioned elements implemented in a software form) stored or encoded in the storage device.

In an embodiment, computer-executable instructions are stored in the storage device, and when the computer-executable instructions are executed, the at least one processor 710 determines, based on each functional part included in a to-be-connected product, meta information of each entity that serves as a hardware basis of the functional part; constructs a model that is expressed in a form of a dimension table and that corresponds to each entity based on the meta information of each entity; obtains corresponding meta information content from the product based on the meta information in the model corresponding to each entity; configures a monitoring task based on the model of each entity and a functional part to which each entity belongs; and monitors the product based on the configured monitoring task and the meta information content in the model corresponding to each entity.

It should be understood that, when the computer executable instructions stored in the storage device are executed, the at least one processor 710 performs the above-mentioned operations and functions described with reference to FIG. 1 to FIG. 6 in the embodiments of this specification.

According to an embodiment, a program product such as a machine-readable medium is provided. The machine-readable medium can have instructions (that is, the above-mentioned elements implemented in software form). When the instructions are executed by a machine, the machine performs the above-mentioned operations and functions described with reference to FIG. 1 to FIG. 6 in the embodiments of this specification.

Specifically, a system or an apparatus equipped with a readable storage medium can be provided, and software program code for implementing the functions in any of the above-mentioned embodiments is stored in the readable storage medium, so that a computer or a processor of the system or the apparatus reads and executes the instruction stored in the readable storage medium.

In such case, the program code read from the readable medium can implement the functions in any one of some embodiments described above, and therefore the machine-readable code and the readable storage medium storing the machine-readable code form a part of this application.

Computer program code required for operation of each part of this specification can be compiled in any one or more programming languages, including an object-oriented programming language such as Java, Scala, Smalltalk, Eiffel, JADE, Emerald, C++, C#, VB, NET, and Python, a conventional programming language such as C language, Visual Basic 2003, Perl, COBOL 2002, PHP, and ABAP, a dynamic programming language such as Python, Ruby, and Groovy, or another programming language. The program code can run on a user computer, or run as a stand-alone package on the user computer, or partially run on the user computer and partially run on a remote computer, or run on the remote computer or server as a whole. In the latter case, the remote computer can be connected to the user computer in any form of network, such as a local area network (LAN) or a wide area network (WAN), or connected to an external computer (for example, via the Internet), or in a cloud computing environment, or used as a service, such as software as a service (SaaS).

Embodiments of the readable storage medium include a floppy disk, a hard disk, a magneto-optical disk, an optical disc (such as a CD-ROM, a CD-R, a CD-RW, a DVD-ROM, a DVD-RAM, a DVD-RW, a DVD-RW), a magnetic tape, a non-volatile memory card, and a ROM. Alternatively, the program code can be downloaded from a server computer or a cloud over a communication network.

Specific embodiments of this specification are described above. Other embodiments fall within the scope of the appended claims. In some cases, the actions or steps described in the claims can be performed in an order different from that in the embodiments, and the desired results can still be achieved. In addition, the process depicted in the accompanying drawings does not necessarily need a particular sequence or consecutive sequence to achieve the desired results. In some implementations, multi-tasking and concurrent processing are feasible or can be advantageous.

Not all steps and units in the above-mentioned processes and system structure diagrams are needed. Some steps or units can be ignored based on actual requirements. An execution sequence of each step is not fixed, and can be determined based on needs. The apparatus structure described in some embodiments can be a physical structure or a logical structure. In other words, some units can be implemented by the same physical entity, or some units can be implemented by a plurality of physical entities, or can be implemented together by some components in a plurality of independent devices.

The term "example" used throughout this specification means "used as an example, an instance, or an illustration" and does not mean "preferred" or "advantageous" over other embodiments. Specific implementations include specific details for the purpose of providing an understanding of the described technologies. However, these technologies can be implemented without these specific details. In some instances, to avoid obscuring the described concepts in the embodiments, well-known structures and apparatuses are shown in the form of a block diagram.

The above-mentioned describes in detail optional implementations of the embodiments of this specification with reference to the accompanying drawings. However, the embodiments of this specification are not limited to specific details in the above-mentioned implementations. Within a technical concept scope of the embodiments of this specification, multiple simple variations of the technical solutions of the embodiments of this specification can be made, and these simple variations are all within the protection scope of the embodiments of this specification.

The above-mentioned description of content in this specification are provided to enable any person of ordinary skill in the art to implement or use content in this specification. It is obvious to a person of ordinary skill in the art that various modifications can be made to content in this specification. In addition, the general principle defined in this specification can be applied to another variant without departing from the protection scope of the content in this specification. Therefore, the content in this specification is not limited to the examples and designs described here, but is consistent with the widest range of principles and novelty features that conform to the disclosure.

What is claimed is:

1. A computer-implemented method for product monitoring, comprising:

determining, based on each functional part comprised in a product for monitoring, meta information of each entity that serves as a hardware basis of each functional part, wherein:

the functional part comprises a functional module of a software product; or the functional part comprises at least one hardware device of a hardware product;

constructing, based on the meta information of each entity, a model of each entity comprising a dimension table, wherein the meta information of the entity comprises a plurality of meta information fields, each meta information field having corresponding meta information content stored as a data element of the dimension table;

obtaining corresponding meta information content from the product based on meta information in the model of each entity;

configuring, as a configured monitoring task, a monitoring task based on the model of each entity and a functional part associated with each entity; and monitoring the product based on the configured monitoring task and meta information content in the model of each entity.

2. The computer-implemented method of claim 1, wherein obtaining corresponding meta information content from the product based on meta information in the model of each entity, comprises:

obtaining corresponding meta information content from the product based on meta information in the model of each entity using a service provider interface (SPI).

3. The computer-implemented method of claim 1, wherein:

configuring, as a configured monitoring task, a monitoring task based on the model of each entity and a functional part to which each entity belongs, comprises:

configuring a monitoring task for each functional part based on each functional part to which each entity belongs; and configuring a data indicator for each functional part based on the model of each entity or the functional part to which each entity belongs; and monitoring the product based on the configured monitoring task and meta information content in the model of each entity, comprises:

processing meta information content of each functional part based on the configured monitoring task and data indicator of each functional part.

4. The computer-implemented method of claim 1, wherein:

the product comprises a software product or a hardware product.

5. The computer-implemented method of claim 1, wherein:

the model of each entity indicates an association between the entity and another entity in the product.

6. The computer-implemented method of claim 1, comprising:

when there is an update on the product, determining, as a determined entity, an entity corresponding to an updated functional part; and constructing, as a constructed model, a model corresponding to the determined entity based on updated meta information in the entity; or updating, as an updated model, a model corresponding to the determined entity based on updated meta information in the entity.

7. The computer-implemented method of claim 6, comprising:

obtaining corresponding meta information content from the product based on the updated meta information in the constructed or updated model.

8. A non-transitory, computer-readable medium storing one or more instructions executable by a computer system to perform one or more operations for system product connection monitoring, comprising:

determining, based on each functional part comprised in a product for monitoring, meta information of each entity that serves as a hardware basis of each functional part, wherein:

the functional part comprises a functional module of a software product; or the functional part comprises at least one hardware device of a hardware product;

constructing, based on the meta information of each entity, a model of each entity comprising a dimension table, wherein the dimension table comprises data elements, each data element corresponding to meta information content associated with a respective meta information field of a plurality of meta information fields comprised in the meta information of the entity;

obtaining corresponding meta information content from the product based on meta information in the model of each entity;

configuring, as a configured monitoring task, a monitoring task based on the model of each entity and a functional part associated with each entity; and monitoring the product based on the configured monitoring task and meta information content in the model of each entity.

9. The non-transitory, computer-readable medium of claim 8, wherein obtaining corresponding meta information content from the product based on meta information in the model of each entity, comprises:

obtaining corresponding meta information content from the product based on meta information in the model of each entity using a service provider interface (SPI).

10. The non-transitory, computer-readable medium of claim 8, wherein:

configuring, as a configured monitoring task, a monitoring task based on the model of each entity and a functional part to which each entity belongs, comprises:

configuring a monitoring task for each functional part based on each functional part to which each entity belongs; and configuring a data indicator for each functional part based on the model of each entity or the functional part to which each entity belongs; and monitoring the product based on the configured monitoring task and meta information content in the model of each entity, comprises:

processing meta information content of each functional part based on the configured monitoring task and data indicator of each functional part.

11. The non-transitory, computer-readable medium of claim 8, wherein:

the product comprises a software product or a hardware product.

12. The non-transitory, computer-readable medium of claim 8, wherein:

the model of each entity indicates an association between the entity and another entity in the product.

13. The non-transitory, computer-readable medium of claim 8, comprising:

when there is an update on the product, determining, as a determined entity, an entity corresponding to an updated functional part; and constructing, as a constructed model, a model corresponding to the determined entity based on updated meta information in the entity; or updating, as an updated model, a model corresponding to the determined entity based on updated meta information in the entity.

14. The non-transitory, computer-readable medium of claim 13, comprising:

obtaining corresponding meta information content from the product based on the updated meta information in the constructed or updated model.

15. A computer-implemented system, comprising:

one or more processors and one or more computer memory devices interoperably coupled with the one or more processors and having tangible, non-transitory, machine-readable media storing one or more instructions that, when executed by the one or more processors, perform one or more operations for system product connection monitoring, comprising:

determining, based on each functional part comprised in a product for monitoring, meta information of each entity that serves as a hardware basis of each functional part, wherein:

the functional part comprises a functional module of a software product; or the functional part comprises at least one hardware device of a hardware product;

constructing, based on the meta information of each entity, a model of each entity comprising a dimension table, wherein the dimension table comprises data elements, each data element corresponding to meta information content associated with a respective meta information field of a plurality of meta information fields comprised in the meta information of the entity;

obtaining corresponding meta information content from the product based on meta information in the model of each entity;

configuring, as a configured monitoring task, a monitoring task based on the model of each entity and a functional part associated with each entity; and monitoring the product based on the configured monitoring task and meta information content in the model of each entity.

16. The computer-implemented system of claim 15, wherein obtaining corresponding meta information content from the product based on meta information in the model of each entity, comprises:

obtaining corresponding meta information content from the product based on meta information in the model of each entity using a service provider interface (SPI).

17. The computer-implemented system of claim 15, wherein:

configuring, as a configured monitoring task, a monitoring task based on the model of each entity and a functional part to which each entity belongs, comprises:

configuring a monitoring task for each functional part based on each functional part to which each entity belongs; and configuring a data indicator for each functional part based on the model of each entity or the functional part to which each entity belongs; and monitoring the product based on the configured monitoring task and meta information content in the model of each entity, comprises:

processing meta information content of each functional part based on the configured monitoring task and data indicator of each functional part.

18. The computer-implemented system of claim 15, wherein:

the product comprises a software product or a hardware product.

19. The computer-implemented system of claim 15, wherein:

the model of each entity indicates an association between the entity and another entity in the product.

20. The computer-implemented system of claim 15, comprising:

when there is an update on the product, determining, as a determined entity, an entity corresponding to an updated functional part; and constructing, as a constructed model, a model corresponding to the determined entity based on updated meta information in the entity; or updating, as an updated model, a model corresponding to the determined entity based on updated meta information in the entity.

* * * * *